(12) United States Patent
Shaw et al.

(10) Patent No.: US 10,683,564 B1
(45) Date of Patent: *Jun. 16, 2020

(54) SYSTEM AND METHOD OF PRODUCING LOW CARBON FERROCHROME AND LOW CARBON FERROCHROME PRODUCED THEREBY

(71) Applicant: MM Metals USA, LLC, Plymouth Meeting, PA (US)

(72) Inventors: Daniel Shaw, Haverford, PA (US); James Saville, Easton, MD (US); John Williams, Oxfordshire (GB); Trevor N. Mustoe, Playa del Carmen (MX)

(73) Assignee: MM Metals USA, LLC, Plymouth Meeting, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,015

(22) Filed: Dec. 5, 2019

Related U.S. Application Data

(63) Continuation of application No. 16/454,283, filed on Jun. 27, 2019, now Pat. No. 10,508,319.

(51) Int. Cl.
| | | |
|---|---|---|
| *C22B 5/04* | (2006.01) |
| *C22C 33/04* | (2006.01) |
| *C22C 38/18* | (2006.01) |
| *C22B 1/24* | (2006.01) |
| *C21D 6/00* | (2006.01) |
| *C21D 8/12* | (2006.01) |
| *C21D 1/74* | (2006.01) |
| *C21D 9/00* | (2006.01) |

(52) U.S. Cl.
CPC ............... *C22B 5/04* (2013.01); *C21D 1/74* (2013.01); *C21D 6/002* (2013.01); *C21D 8/1205* (2013.01); *C21D 9/0025* (2013.01); *C21D 9/0068* (2013.01); *C22B 1/24* (2013.01); *C22C 33/04* (2013.01); *C22C 38/18* (2013.01)

(58) Field of Classification Search
CPC .... C22B 5/04; C22B 1/24; C21D 1/74; C21D 6/002; C21D 8/1205; C21D 9/0025; C21D 9/0068; C22C 33/04; C22C 38/18
See application file for complete search history.

(56) References Cited

U.S. PATENT DOCUMENTS 5,009,703 A     4/1991   Arvidson et al.
2016/0237526 A1  8/2016   Winter

FOREIGN PATENT DOCUMENTS

KR        20100098953 A     9/2010

*Primary Examiner* — Jenny R Wu
(74) *Attorney, Agent, or Firm* — Caesar Rivise, PC

(57) ABSTRACT

A system and method for recovering a high yield of low carbon ferrochrome from chromite and low carbon ferrochrome produced therefrom. A stoichiometric mixture of feed materials including scrap aluminum granules, lime, silica sand, and chromite ore are provided into a plasma arc furnace. The scrap aluminum granules are produced from used aluminum beverage containers. The feed materials are heated, whereupon the aluminum in the aluminum granules produces an exothermic reaction reducing the chromium oxide and iron oxide in the chromite to produce molten low carbon ferrochrome with molten slag floating thereon. The molten low carbon ferrochrome is extracted, solidified and granulated into granules of low carbon ferrochrome. The molten slag is extracted, solidified and granulated into granules of slag.

30 Claims, 4 Drawing Sheets

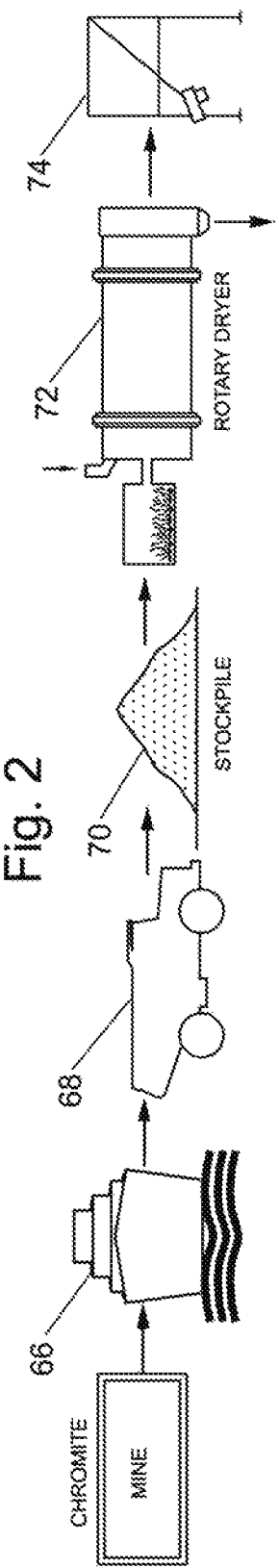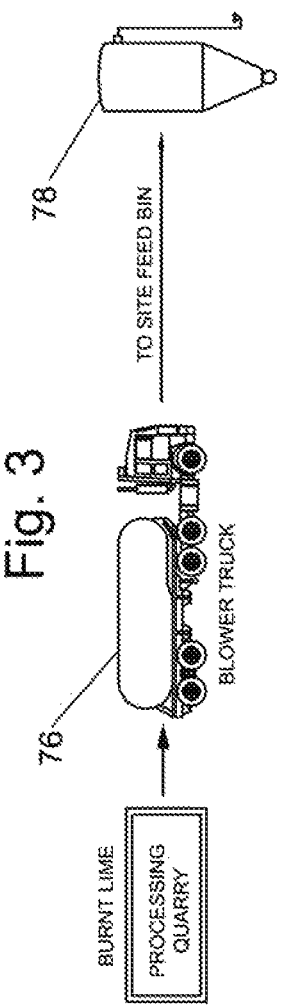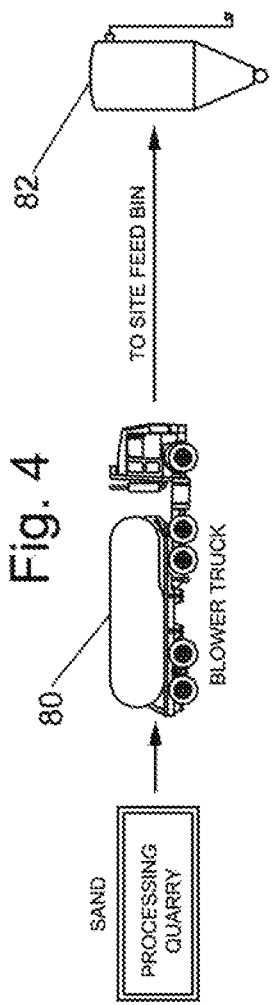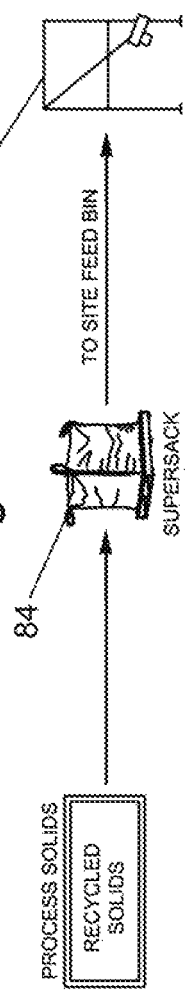

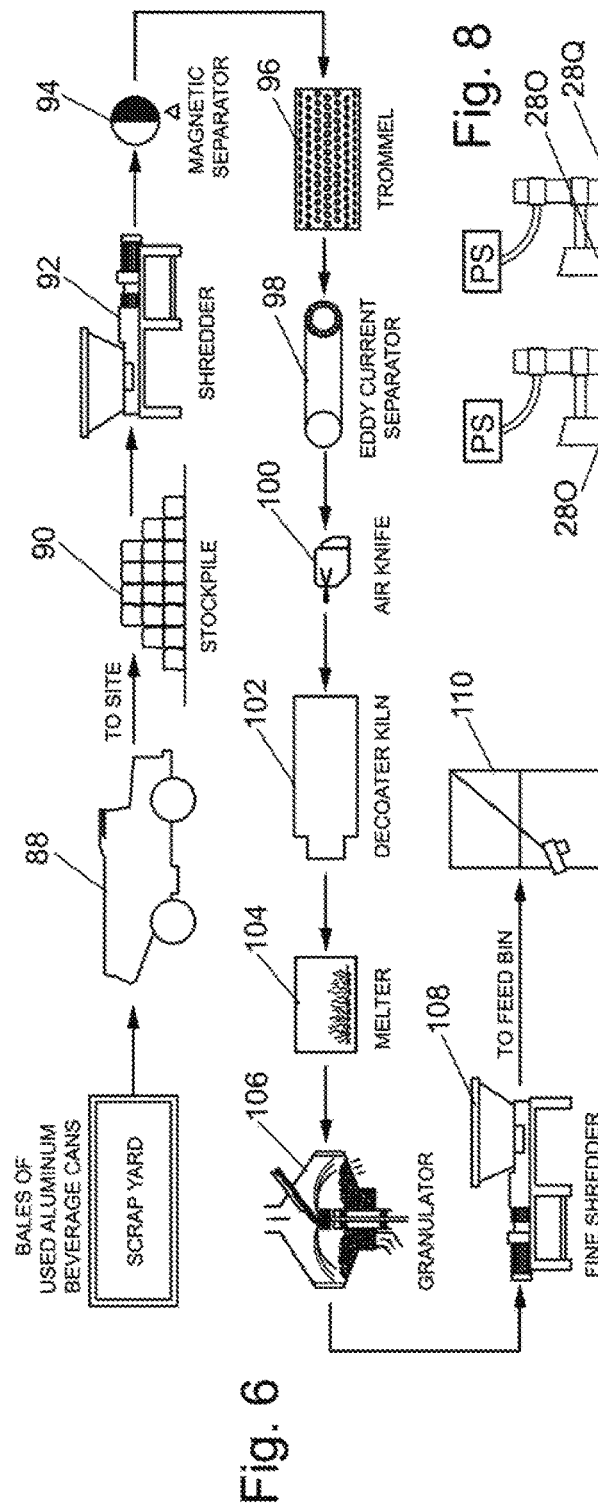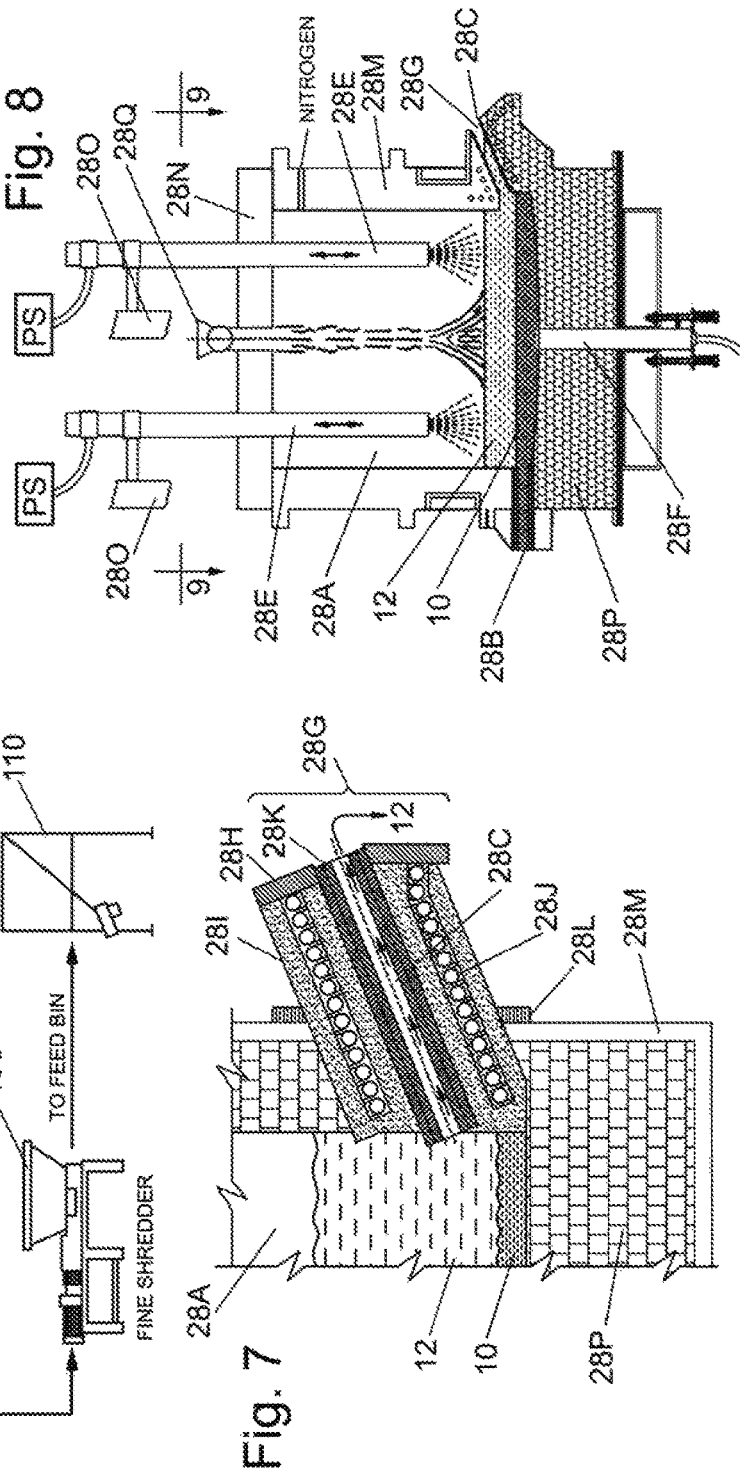

SYSTEM AND METHOD OF PRODUCING LOW CARBON FERROCHROME AND LOW CARBON FERROCHROME PRODUCED THEREBY

CROSS-REFERENCE TO RELATED APPLICATIONS

This utility application is a continuation of and claims the benefit under 35 U.S.C. § 120 of U.S. application Ser. No. 16/454,283, filed on Jun. 27, 2019, entitled Method and System for Producing Low Carbon Ferrochrome From Chromite Ore and Low Carbon Ferrochrome Produced Thereby. The entire content of the foregoing application is expressly incorporated herein by reference thereto.

FIELD OF THE INVENTION

This invention relates generally to alloy forming and more particularly to methods and systems for producing low carbon ferrochrome from chromite ore and low carbon ferrochrome produced thereby.

BACKGROUND OF THE INVENTION

Low carbon ferrochrome ("LC FeCr') is a niche product having several uses, the most common of which being for "trimming adjustment" of high chromium content steels in ladle furnaces where introduction of carbon from high carbon ferrochrome is unacceptable. There are several grades of LC FeCr with varying amounts of carbon, silicon and nitrogen and which are produced from chromite ores. LC FeCr may be manufactured from chromite ore by several processes—Perrin process, Duplex process using silicon as reductant in the form of ferro silicon chrome. Aluminum has been used as an alternative reducing agent instead of using silicon. By using aluminum as the reducing agent, instead of using carbon, one is able to produce the metal alloy low carbon ferrochrome which contains about 70% chromium. However, the prior art systems and methods for producing the LC Fe Cr from chromite leave much to be desired from the standpoints of economic and environmental protection.

Thus, a need exists for a method of producing low carbon ferrochrome from chromite ore which can be carried out economically and is environmentally friendly. The subject invention addresses that need.

BRIEF SUMMARY OF THE INVENTION

One aspect of this invention constitutes a method or process for producing low carbon ferrochrome from chromite ore. The method/process basically entails feeding a mixture of feed materials comprising scrap aluminum granules, burnt lime, silica sand, and chromite ore into a plasma arc furnace. The scrap aluminum granules are produced from aluminum used beverage containers (hereinafter "UBC"). The chromite ore contains chromium oxide and iron oxide. The feed materials are provided in a stoichiometric proportion for reduction of the chromium oxide and iron oxide to form low carbon ferrochrome. The feed materials are heated in the plasma arc furnace to a temperature in the range of approximately 1,650° to 1850° C. wherein the aluminum in the aluminum granules acts as a reducing agent to produce an exothermic reaction reducing the chromium oxide and iron oxide in the chromite ore to produce molten low carbon ferrochrome with molten slag floating on top of the molten low carbon ferrochrome. The molten low carbon ferrochrome is then extracted from the plasma arc furnace.

In accordance with one preferred aspect of the method of this invention, the method additionally comprises granulating the molten low carbon ferrochrome extracted from the plasma arc furnace to produce dry granulated low carbon ferrochrome.

In accordance with another preferred aspect of the method of this invention, the dry granulated low carbon ferrochrome is produced by casting the molten low carbon ferrochrome into ingots and thereafter breaking and crushing the ingots into the dry granulated low carbon ferrochrome.

In accordance with another preferred aspect of the method of this invention, the method additionally comprises extracting the molten slag from the plasma arc furnace and granulating the extracted molten slag into dry granulated particles of slag.

In accordance with another preferred aspect of the method of this invention, the dry granulated particles of slag are produced by using a spinning disk granulator to disintegrate the extracted molten slag to produce droplets of the molten slag and quenching the droplets using a low temperature, high volume cooling gas flow from a blower, whereupon the droplets are solidified to form the dry granulated particles of slag.

In accordance with another preferred aspect of the method of this invention, the cooling gas is air and wherein the method additionally comprises recovering heat from the air for use in drying at least one of the feed materials.

In accordance with another preferred aspect of the method of this invention, the cooling gas is nitrogen gas and wherein the method additionally comprises recovering heat from the nitrogen gas for use in preheating the feed materials fed to the plasma arc furnace.

In accordance with another preferred aspect of the method of this invention, nitrogen under pressure higher than atmospheric pressure is provided into the plasma arc furnace to prevent oxygen from entering into the plasma arc furnace.

In accordance with another preferred aspect of the method of this invention, the nitrogen is heated and wherein the pressure is at least 0.5 inch of water gauge above atmospheric pressure.

In accordance with another preferred aspect of the method of this invention, the plasma arc furnace includes at least one transferred arc electrode.

In accordance with another preferred aspect of the method of this invention, the method is continuous.

In accordance with another preferred aspect of the method of this invention, the feeding of the feed materials of the mixture of feed materials is controlled.

In accordance with another preferred aspect of the method of this invention, the scrap aluminum granules are produced from bales of UBC by breaking the bales into individual beverage containers which are shredded to release non-aluminum solid and liquid matter. The non-aluminum solid matter is separated to result in residual shredded UBC. The residual shredded UBC are cleaned to result in cleaned residual shredded UBC. The cleaned residual shredded UBC are decoated to result in decoated cleaned residual shredded UBC. The cleaned decoated residual shredded UBC are fed into a melting furnace or melter to produce molten scrap aluminum. The molten scrap aluminum is solidified and granulated into the scrap aluminum granules or drawn into wire. The scrap aluminum granules or wire are shredded or chopped to a selected size range most suitable for the reduction of the chromium oxide and iron oxide in the plasma arc furnace.

In accordance with another preferred aspect of the method of this invention, the separating and cleaning is accomplished by passing the UBC through a magnetic separator to remove magnetic particles, passing the UBC through an eddy current separator to remove any non-ferrous metals, wood and other trash, passing the UBC over a screen to remove any dirt, liquids and water, and passing the UBC through an air knife to remove any residual water, plastic and paper.

In accordance with another preferred aspect of the method of this invention, the decoating of the cleaned residual shredded UBC is accomplished by heating in a decoating furnace to remove ink, lacquer and other coatings thereon.

In accordance with another preferred aspect of the method of this invention, the UBC are melted in a furnace to form liquid aluminum, which is thereafter solidified and chopped to form the scrap aluminum granules of a predetermined size range.

In accordance with another preferred aspect of the method of this invention, the predetermined size range is between approximately 0.1 mm and 2.0 mm.

In accordance with another preferred aspect of the method of this invention, the amount of aluminum granules used in the mixture of feed materials is equivalent to approximately 105% to 120% of the stoichiometric quantity of aluminum required to react with the chromite ore in the mixture of feed materials.

In accordance with another preferred aspect of the method of this invention, the scrap aluminum granules are produced from used beverage container aluminum metal alloys containing up to approximately two percent magnesium content, whereupon an exothermic reaction of the magnesium with the chromite ore supplements the exothermic reaction of the aluminum.

In accordance with another preferred aspect of the method of this invention, the method additionally comprising extracting the molten slag from said plasma arc furnace at an outlet taphole.

In accordance with another preferred aspect of the method of this invention, the extraction of the molten slag at the outlet taphole is carried out continuously.

In accordance with another preferred aspect of the method of this invention, the method additionally comprises extracting the molten slag continuously from the plasma arc furnace through a silicon carbide tube forming part of an outlet taphole, and applying supplementary heat to the molten slag inside the tube at the outlet taphole.

In accordance with another aspect of this invention the outlet taphole extends at an upward acute angle, whereupon if there is any molten low carbon ferrochrome in the slag the molten low carbon ferrochrome will drop or flow back down the taphole into the plasma arc furnace due to the fact that the low carbon ferrochrome has a higher density than the slag.

Another aspect of this invention is low carbon ferrochrome produced by the method of this invention.

Another aspect of this invention is method of producing a metal or metal alloy from feed materials located within in a chamber in a plasma arc furnace. The method entails providing three individual and electrically isolated vertical DC arc graphite electrodes in the furnace above the feed materials in the chamber. A controlled and controllable constant DC output current is provided to each of the electrically isolated DC arc graphite electrodes to initiate a respective plasma arc from each to heat the feed materials in the chamber to produce a molten material bath in the chamber. The height of the arc of each of the DC graphite cathode electrodes with respect to the feed materials is individually established until a desired voltage is established to produce the molten material bath in the chamber, with the voltage varying as a function of the sum of the resistance of the plasma arc above the molten material bath, and the resistance of the plasma arc in the molten material bath. The molten material bath is stirred, with the stirring resulting from current flowing through the molten material bath producing joule heating coupled with a magnetic effect of current flow through the molten bath to cause a local ripple effect or stirring motion in the molten material bath.

In accordance with another preferred aspect of the method of this invention, the initiating of the plasma arcs is accomplished by energizing the plasma power supplies, lowering the DC graphite cathode electrodes into the furnace to contact a layer of metal or metal alloy covering return anode electrodes that project upward into the molten material bath. A start current is selected for application by the constant current supply to cause the flow of current, whereupon the DC arc graphite cathode electrodes are raised until the desired voltage is established.

In accordance with another preferred aspect of the method of this invention, the initiating of the plasma arcs is accomplished by energizing the plasma arc power supplies. A start current is selected for application by the constant current supply to result in an open circuit voltage, but no current flow. The DC arc graphite cathode electrodes are lowered to contact a layer of metal or metal alloy covering return anode electrodes that project upward into the molten material bath. When the current is flowing, the DC arc graphite cathode electrodes are raised until the desired voltage is established.

In accordance with another preferred aspect of the method of this invention, pieces of metal or metal alloy are provided into the chamber where the molten material bath is located to form a molten layer of metal or metal alloy in contact with the anode return electrodes.

In accordance with another preferred aspect of the method of this invention, the method additionally comprises maintaining the DC arc graphite electrodes at a fixed height, and varying the DC output current of each of the plasma power supplies in a sinusoidal or square wave fashion over a given range of current to promote stirring whilst maintaining the temperature of the molten material bath.

In accordance with another preferred aspect of the method of this invention, the method additionally comprises controlling the DC output current of each of the power supplies so that they can be offset in time by 120 degrees to distribute the local effect over the whole molten material bath.

In accordance with another preferred aspect of the method of this invention, the metal or metal alloy comprises low carbon ferrochrome.

In accordance with another preferred aspect of the method of this invention, pieces of low carbon ferrochrome are provided into the chamber where the molten material bath is located to form a molten layer of low carbon ferrochrome in contact with the anode return electrodes.

Another aspect of this invention is a metal or metal alloy produced by the method of this invention.

Another aspect of this invention is low carbon ferrochrome produced by the method of this invention.

BRIEF DESCRIPTION OF SEVERAL VIEWS OF THE DRAWINGS

FIG. 2 is an illustration of one portion of a system for producing one of the feed materials used in the system and method of this invention, i.e., the chromite ore;

FIG. 3 is an illustration like that of FIG. 2 showing another portion of a system for producing another of the feed materials used in the system and method, i.e., the burnt lime forming the recoverable slag produced by the system and method;

FIG. 4 is an illustration like that of FIGS. 2-3 showing another portion of a system for producing another of the feed materials used in the system and method, i.e., the sand forming the recoverable slag produced by the system and method;

FIG. 5 is an illustration like that of FIGS. 2-4 showing another portion of a system for producing another of the feed materials used in the system and method, i.e., the recycled solids forming the recoverable slag produced by the system and method;

FIG. 6 is like that of FIGS. 2-5 showing another portion of system for producing the last of the feed materials used in the system and method, i.e., the UBC;

FIG. 7 is an enlarged vertical sectional view of a portion of one exemplary plasma arc furnace forming a portion of the system of this invention and suitable for use in the methods of this invention, the portion constituting the outlet port or "taphole" for slag produced within the furnace;

FIG. 8 is an enlarged vertical sectional view of an arc furnace like that shown in FIG. 1;

DETAILED DESCRIPTION OF ONE EXEMPLARY PREFERRED EMBODIMENT OF THE INVENTION

Figure 1:
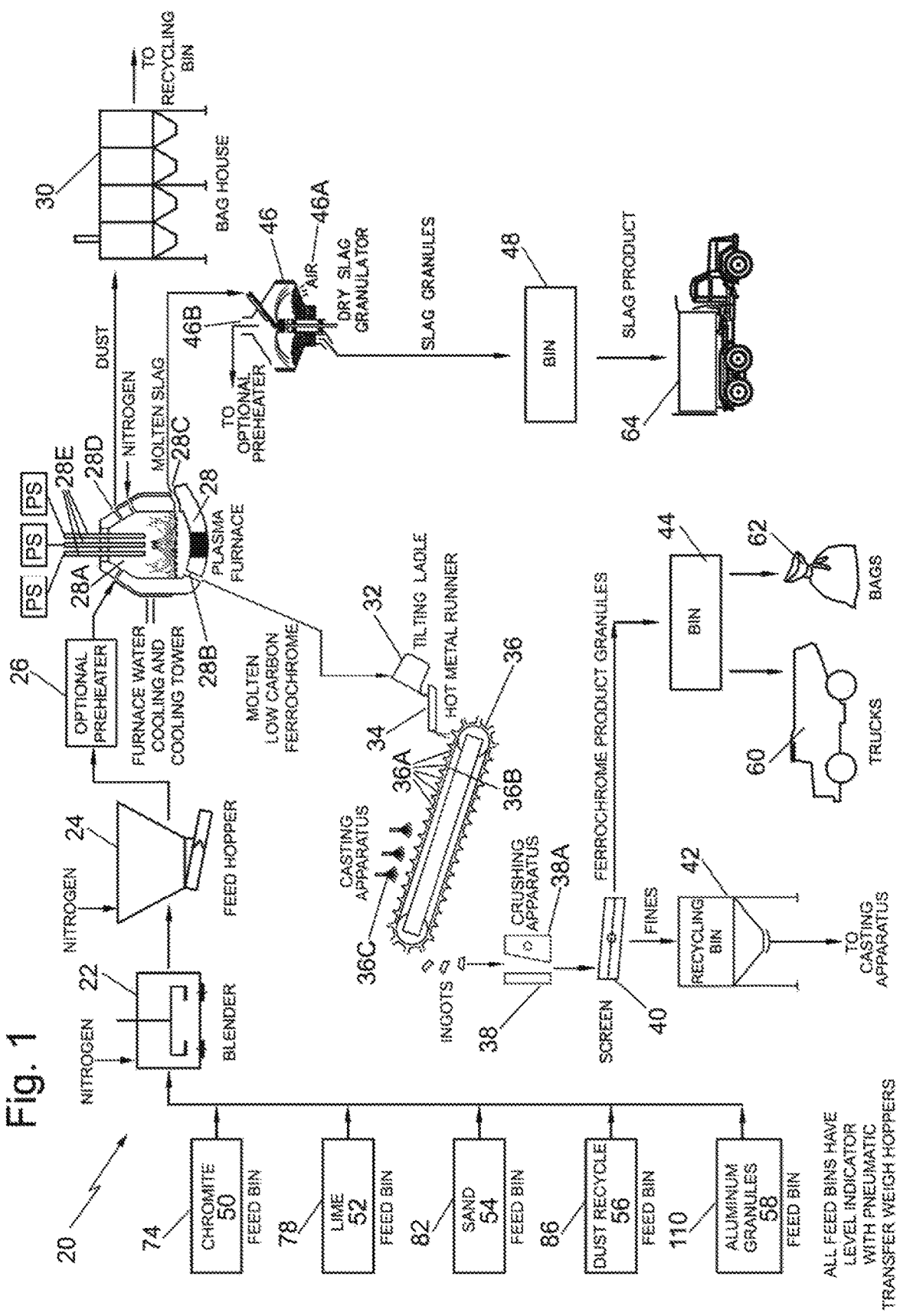
FIG. 1 is an illustrative diagram showing one exemplary embodiment of a system for carrying out the methods of this invention to produce low carbon ferrochrome and recoverable slag from chromite and other feed materials using the aluminum and magnesium contained in one of the feed materials, i.e., the UBC.

Referring now to the various figures of the drawing wherein like reference characters refer to like parts, there is shown in FIG. 1 one exemplary system 20 constructed in accordance with this invention for carrying out a method or process of this invention to produce low carbon ferrochrome granules (referred to hereinafter as "ferrochrome product granules"), and slag granules (referred to hereinafter as "slag product granules"). The ferrochrome product granules are suitable for various uses, e.g., the "trimming adjustment" of high chromium content steels in ladle furnaces. The slag product granules are suitable for various uses, e.g., the making of cement and concrete.

The system 20 basically comprises a blender 22, a feed hopper 24, an optional heater 26, a plasma arc furnace 28, a bag house 30, a tilting ladle 32 with an associated hot metal runner 34, a casting apparatus 36, a crusher apparatus 38, a screen 40, a recycling bin 42, a low carbon ferrochrome granules collecting bin 44, a dry slag granulator 46, and a slag granule collecting bin 48. The blender is configured to receive the feed materials for producing the ferrochrome product granules and the slag product granules. Those feed materials are chromite ore 50, lime (e.g., burnt limestone) 52, sand 54, recycled materials 56, and aluminum granules 58. The aluminum granules are produced from aluminum beverage containers or cans, which may either be used or unused, although in the interest of economics are preferably all UBC or some UBC and some unused aluminum beverage cans.

In any case, the feed materials are provided from respective feed bins to the blender 22 in a desired and controlled proportion to one another. To that end, each of the feed material supply bins have a conventional level indicator (not shown) with an associated conventional controllable pneumatic transfer weigh hopper (not shown) to provide the desired amount of the particular feed material to the blender 22.

The blender is a conventional device (e.g., like that available from Kelly Duplex Mill & Manufacturing Co.) and is configured to mix the feed materials together and provide the mixed feed materials to the feed hopper 24. The blender is supplied with nitrogen gas to displace oxygen from the air entrained in the feed materials. The feed hopper is a conventional device (e.g., like that available from Coperion K-Tron) and is configured to store the materials and feed them at a controlled rate into the plasma arc furnace 28 so that the aluminum in the UBC is in a stoichiometric proportion to the chromite. To that end, a weigh scale (not shown) is used with the feed hopper so that the amount of feed materials fed to the furnace can be controlled by a controller (not shown). When the feed materials are in the furnace and the furnace is operated the aluminum from the UBC act as a reducing agent to produce an exothermic reaction reducing the oxygen in chromium oxide and iron oxide of the chromite to produce molten low carbon ferrochrome with molten slag floating on top of the molten low carbon ferrochrome. The molten slag produced by the exothermic reaction of the aluminum with the chromite results in aluminum oxide being in the slag, but not in the low carbon ferrochrome.

It should also be noted that UBC typically contain up to approximately two percent magnesium (e.g., typically about 1.9% magnesium). The pull tabs included in many such cans may include more magnesium to provide additional strength to the can. In any case, the magnesium in the UBC will also produce an exothermic reaction with the chromite to supplement the exothermic reaction of the aluminum with the chromite in the furnace. The use of magnesium to supplement the exothermic reaction results in the addition of magnesium oxide to the slag, but not into the low carbon ferrochrome.

In accordance with one preferred aspect of this invention, the process is a continuous process with the feed rate of the reactants and the power input of the plasma electrodes in the plasma arc furnace 28 being controlled by the controller to ensure that the molten phase will not cool down excessively if the feed rate of the feed materials is altered to alter the rate of exothermic reaction.

In the exemplary embodiment of the system 20 shown in FIG. 1, the plasma furnace is an electric arc furnace. FIG. 8 is a somewhat simplified vertical sectional view of an exemplary embodiment of a furnace 28 constructed in accordance with this invention. The furnace 28 includes a chamber 28A into which the feed materials are fed and where the exothermic reaction takes place to result in the reduction of the chromium oxide and the iron oxide in the chromite by the aluminum and magnesium in the aluminum UBC. The chamber 28A is filled with an inert gas, e.g., nitrogen under positive pressure of at least 0.5 inch water gauge above atmospheric pressure to exclude oxygen from the furnace. The exothermic reaction within the chamber results in the production of molten low carbon ferrochrome 10 in a bath at the bottom of the chamber 28A with molten slag 12 floating on top of the molten low carbon ferrochrome 10. The function of the plasma "flame" is to control furnace and slag temperature to desired range, e.g., (e.g., 1,650° C. to 1850° C.) to maintain a very fluid slag layer into which the reagents enter and react. The nitrogen atmosphere maintained inside the furnace ensures that the aluminum reagent does not react with gaseous oxygen before entering the slag layer and that chromium oxide in any fume from the furnace is not oxidized to chromium VI form.

The chamber 28A includes a lower outlet or taphole 28B from which the molten low carbon ferrochrome 10 flows when opened, and an upper outlet or taphole 28C from which the molten slag 12 flows when opened. The plasma arc furnace also has an exit port 28D through which nitrogen gas and off-gas dust particles produced within the furnace during operation of the furnace exit from the furnace. This dust is collected in the bag house 30, from whence the dust is carried to and collected in the recycling bin 42.

Figure 9:
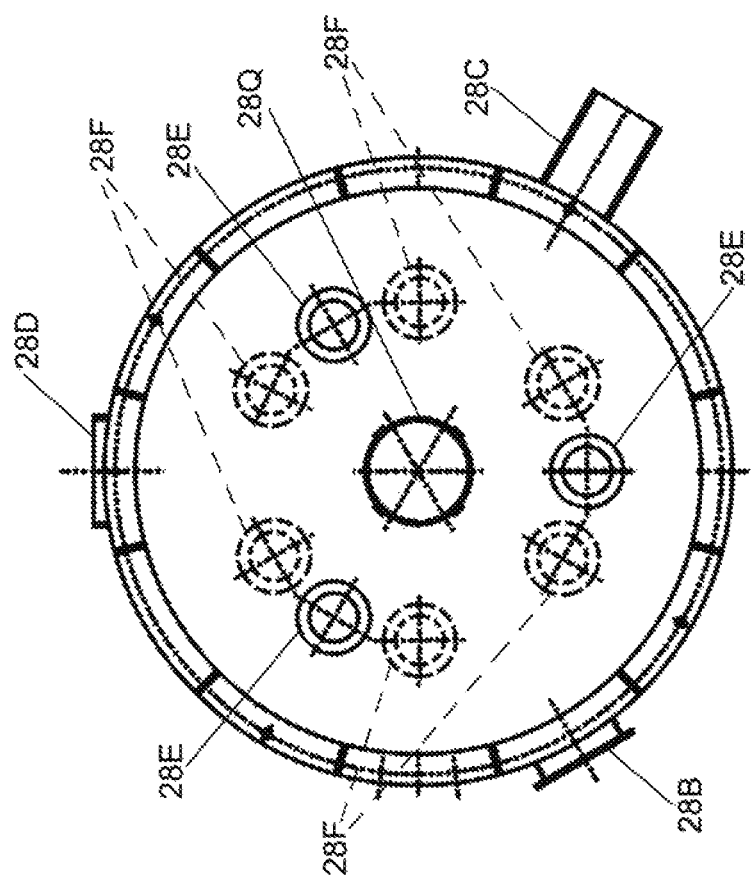
FIG. 9 is an enlarged sectional view taken along line 9-9 of FIG. 8.

In accordance with one preferred aspect of the system of this invention, and as best seen in FIGS. 8 and 9, the arc furnace 28 includes three, graphite plasma transferred arc cathode electrodes 28E and six anode electrodes 28F (although fewer anode electrodes can be used). The cathode electrodes extend through the top or roof 28N of the furnace and into to the chamber 28A. The cathode electrodes 28E are disposed in a circular array equidistantly from one another, i.e., at 120 degree, spacing. Each of the cathode electrodes 28E is powered from an individually controlled DC power supply PS. The electrodes 28E may be graphite circular section rods with threaded connections so that additional electrode rods may be joined to the graphite rods as the tips of the graphite rods are consumed due to the extremely high temperature of the plasma electric flame. Cooling water for the shell and roof of the furnace is provided from a furnace water cooling device, such as an air cooled heat exchanger or cooling tower (not shown). The anode electrodes 28F extend vertically through the bricks 28P at the bottom of the furnace and into the bottom of the chamber 28A, which forms the bath in which the melt of the molten low carbon ferrochrome 10 and the molten slag 12 is produced. The anode electrodes 28F are also disposed in a circular array and are equidistantly spaced from one another by sixty degrees. As will be described in detail later the electrodes 28E and 28F are operated to provide an effective stirring of the molten low carbon ferrochrome and the molten slag.

As is known slag formulations with an aggressive composition have a severe detrimental effect on refractory materials making up an arc furnace. Even under the condition of "static" slag, erosion rates are severe and catastrophic failure soon occurs. The combination of the aggressive slag and the movement of the slag through the exit (e.g., outlet taphole) of the furnace create an extremely difficult challenge to the refractory material. This is typically resolved by using a replaceable tap-hole block or preferentially by the use of a water-cooled slag refractory lined discharge spout. The disadvantages of the water cooled discharge spout are two-fold. First, it is difficult to start the flow of slag even with a substantial "head" of liquid slag. Second, it is difficult to maintain an adequate flow of slag as the "head" of slag diminishes.

One preferred aspect of this invention comprises extracting the molten slag continuously from the plasma arc furnace through a silicon carbide tube forming part of the slag outlet taphole, and applying supplementary heat to the molten slag inside that tube at the slag outlet taphole 28C. To that end, the furnace 28 includes a slag taphole assembly 28G, which is best seen in FIG. 7. In particular, FIG. 7 is an enlarged vertical cross-sectional view of the portion of the plasma arc furnace at the upper outlet or cylindrical taphole 28C from which the molten slag 12 exits the furnace. The operation of the slag taphole assembly 28G enables the slag 12 to flow continuously from the furnace in order to maintain a constant depth of slag within the furnace.

The slag taphole assembly 28G basically comprises consisting a steel container box 28H, a refractory lining 28I, a water-cooled induction coil 28J, silicon carbide tube 28K, and terminal connections (not shown) for respectively supplying cooling water and high frequency electricity to the water-cooled induction coil 28J. The high frequency electricity is provided by an electrical power supply (not shown). The water-cooled induction coil is a tubular helical member formed of an electrically conductive material, e.g., copper, and through which cooling water is passed. The induction coil 28J surrounds the silicon carbide tube 28K. The silicon carbide tube 28K acts as a "susceptor" for the electromagnetic field generated by the high frequency current supplied by a high frequency power supply. As is known, the term "susceptor" as used in induction heating denotes an electrically conductive material placed between the induction heating coil and the material to be heated, in this case, the slag 12. Use of a susceptor provides an effective means for heating non-conductive materials like slag. The susceptor is heated by the electromagnetic field established by the induction coil so that the slag is heated primarily by radiation and conduction from the heated susceptor tube. The silicon carbide material used as the susceptor tube is very resistant to chemical and abrasion attack by the molten slag with melting point 2,730° C. and dissociation temperature over 2,000° C. The susceptor tube 28K may be produced by various processes including nitride bonded silicon nitride. The copper coil 28J is embedded in castable refractory material along substantially the entire length of the taphole 28C. The supplementary heat is applied to the slag within the tube by means of a high frequency alternating electrical supply power supply connected to a water-cooled copper electric induction coil 28J. The electrical energy for powering the induction heating coil is controlled by varying the frequency of the associated power supply. Passage of alternating electrical current through the induction coil produces a magnetic field that generates heat in the susceptor tube through which the slag flows from the furnace to discharge to a launder (not shown) supplying molten slag to the dry slag granulator 46.

The supplementary heat provided to the slag from the induction heated susceptor tube may be adjusted in order to control the temperature and thereby the viscosity of the slag flowing continuously from the plasma furnace and to ensure that the slag does not solidify within that outlet taphole. The supplementary heat may also be applied to melt slag that may have frozen in the slag outlet taphole in the event of cessation of feed to the furnace or loss of power to the plasma furnace.

In the event of failure of any of its components parts, the slag taphole assembly is designed so that the entire unit consisting the steel container box, the refractory lining, the water-cooled the copper induction coil, the silicon carbide susceptor tube, and the terminal connections for supply of cooling water and high frequency electricity to the copper induction coil may be removed from the furnace shell and replaced with a similar taphole assembly. To that end, the steel container box 28H with its internal components is releasably connected or mounted on the furnace at the outlet taphole 28C by a flange 28L connected to the furnace's shell 28M.

Another important feature of the plasma arc furnace 28 is the fact that the passageway for the slag through the taphole assembly 28G, i.e., the slag taphole 28C, extends at an upward acute angle, e.g., approximately 25°, as clearly shown in FIG. 7. The upward angularly extending taphole 28C serves an important function. In particular, if there are any molten low carbon ferrochrome particles in the slag as the slag flows upward in the taphole 28C to exit the taphole, the molten low carbon ferrochrome (metal) will drop or flow back down the angled taphole into the furnace due to the fact that it is more than twice the density of the slag. Thus, the molten low carbon ferrochrome metal will be returned to the interior of the furnace from the taphole 28C so that it will eventually exit the taphole 28B, while the slag itself will flow out of the taphole 28C.

As mentioned above the plasma arc furnace 28 makes use of three cathode electrodes 28E and up to six anode electrodes 28F. Those electrodes are constructed and operated in accordance with another aspect of a method of this invention the result of which is the advantageous stirring of the molten material bath in the furnace. That stirring effect produces and maintains a well-mixed, very fluid slag layer over the full surface area of the furnace bath so that the feed material is rapidly absorbed into the molten layer wherein the aluminothermic and magnesiothermic reduction reactions take place with the chromite ore. By operating the furnace with an oxygen-free atmosphere, the aluminum and magnesium do not react prior to entering the molten slag layer. The exothermic reactions of the aluminum and magnesium with the chromite in the slag layer thereby heat the slag and metal layers. The purpose of the plasma heating is to raise and maintain the temperature of the slag layer formed from the slag making oxides in the chromite spinel and the lime and silica fluxes added in the feed mixture. An additional purpose of the plasma heating is to raise and maintain the temperature of the slag layer to reduce the viscosity of the slag so that the slag flows readily and continuously through the slag taphole 28C. The heat from the plasma arcs also offset the heat losses through refractory bricks and water cooling systems that are part of the plasma furnace.

It must be pointed out at this juncture that the construction of the furnace electrodes, their associated electrical components and their mode of operation to achieve advantageous stirring is not limited to the production of low carbon ferrochrome in a plasma arc furnace. Thus, the construction and method of use of the electrodes for stirring slag and metal layers in a plasma arc furnace can be used to advantageously produce various other types of metals and alloys in a plasma arc furnace.

Turning now to FIGS. 8 and 9 it can be seen that the three individual and electrically isolated DC transferred arc graphite electrodes 28E extend vertically through the roof 28N of the plasma furnace 28. Each electrode 28E is fitted with independent height control so that the position of each of the electrode rods above the molten material bath can be controlled. To that end, the furnace is provided with three respective vertical support columns 280, each incorporating a movable horizontal arm that includes an electrically insulated clamping mechanism for holding and altering the vertical position of its associated cathode electrode 28E and a connection clamp for the supply of electricity to the associated cathode electrode. Each cathode electrode is provided with electricity from a respective separately controlled DC plasm arc power supply PS. The arm, the electrode clamping mechanism and the electricity supply clamp of each of the support columns 280 is configured to be moved in a vertical direction to raise or lower the associated cathode electrode to adjust the arc length and to account for ablation and erosion of the graphite by the electrical arc from the end of the electrode to the melt. As mentioned earlier, the electrode rods are machined with internal and external threading at the ends so that additional graphite rods may be joined thereto as the tips of the graphite rods are consumed due to the high temperatures of the plasma arc flame. This feature enables one to maintain continuous operation of the electrodes. The additional rods may be connected to the electrodes in use using a movable jib crane arrangement.

Each of the three DC plasma arc power supplies PS for the three cathode electrodes 28E provide a controlled and controllable constant current supply, with the voltage being allowed to vary depending on the "arc" resistance. The "arc" resistance is sum of the resistance in the open arc and the resistance in molten bath to the anode return. The power supplies PS are connected as a single positive common point to the return electrodes (anodes) 28F. The return anode electrodes may be made of heat resistant steel, and are mounted so that they project vertically upward through the refractory base of the furnace to make contact with the metal layer, e.g., the molten ferrochrome, of the bath and thereby complete the electrical circuit through the metal and slag layers of the bath to the three graphite cathode electrodes 28E. The return anode electrode connection points are water-cooled to prevent overheating.

Initiating the plasma arcs can be carried out in at least two ways in accordance with the method of this invention. Both ways start in a similar manner, i.e., energizing the power supplies PS and then lowering the cathode electrodes 28E into the furnace to contact a hearth return electrode formed by a layer of low carbon ferrochrome metal 10 in contact or covering the return anode electrodes 28F. In order to ensure that there will be a layer of low carbon ferrochrome metal in contact or covering the return anode electrodes 28F, prior to the initial start-up pieces of low carbon ferrochrome can be placed in the bottom of the furnace so the plasma arc will form a molten layer of metal in contact with the top portion of the anode electrodes 28F. One of the ways of initiating the plasma arc entails selecting a "Start Current" setting together with 'Plasma On" setting on the plasma power supplies PS. Ignition of the arcs, (current flow indicated) is followed by raising the electrodes until a satisfactory voltage is established. The other of the way of initiating the plasma arcs is accomplished by selecting a "Start Current" setting and 'Plasma On" on the plasma power supplies which results in "Open Circuit Voltage" but no current flow, followed by lowering the electrodes into the furnace to contact the hearth return electrode or metal covering. Ignition of the arcs, (current flow indicated) is followed by raising the electrodes until a satisfactory voltage is established. In either case, when a liquid pool in the furnace hearth is observed the stirring process should be initiated.

Current flowing from the plasma electric arc through the molten bath provides "Joule Heating" from the resistance of the slag to the flow of the current through the slag layer in the immediate area of impingement of the arc from each plasma cathode electrode. This increase in temperature due to Joule Heating changes the viscosity of the slag in the local area. This effect combined with the induced magnetic field "Corkscrew" effect causes a rotational effect on the volume of lower viscosity slag in the immediate area of the arc impingement that is generated by the flow of electric current through the resistive slag layer. This continuously moving slag layer contains reacting and reduced metal particles of aluminum and ferrochrome. In addition, the local "Corkscrew" magnetic stirring effect occurs in the metal bath layer. The fact that the six anodes electrodes are offset from the three cathode electrodes, as clearly shown in FIG. 9, accentuates the stirring effect and causes a local "ripple" effect or stirring motion in the entire molten material bath.

Figure 10:
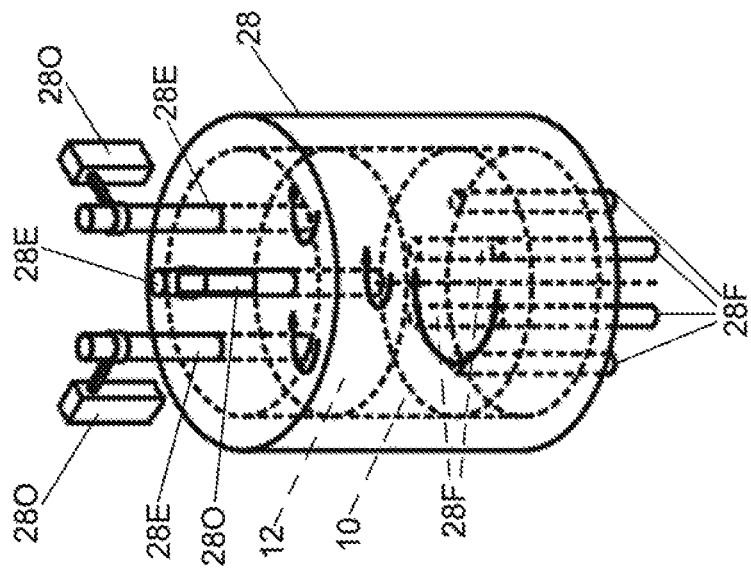
FIG. 10 is a three dimensional illustration of the arc furnace shown in FIG. 8 during the stirring of the molten material bath in the furnace.

The subject invention uses the three cathode electrodes 28E to achieve this effect over the whole bath. In particular, while maintaining the electrodes at a fixed height, the DC output current of each of the plasma power supplies is varied in a sinusoidal or square wave fashion over a given range of current to promote a local stirring effect in the slag and metal whilst maintaining the overall bath temperature above 1750° C. Voltage of the arcs will vary depending upon the total resistance of the electrical path consisting of the arc length in the nitrogen atmosphere above the batch, slag layer resistance and the metal bath layer resistance. The output current of each power supply can be offset in time by 120 degrees to distribute the local stirring effect surrounding each electrode over the whole bath to enhance stirring motion, heating and mixing of the feed material as it enters the molten slag layer. This stirring effect is illustrated schematically in FIG. 10. It should be noted that the slag layer is also flowing towards and out of the furnace through the slag taphole 28C causing continual movement of the slag.

The feed materials are introduced into the furnace's chamber 28A through the furnace's feed port 28Q. While not mandatory, it is preferred that an optional preheater 26 be used to preheat the mixed feed materials from the feed hopper 24 before the mixed feed materials are introduced into the furnace 28. By so doing, less energy is required of the furnace to bring the feed materials mixture up to the operating temperature range (e.g., 1,650 to 1850° C.).

The tilting ladle 32 is a conventional device (e.g., like that available from TeeMark Manufacturing, Inc. under the trade designation D&E Foundry Ladles) and is configured to receive the molten low carbon ferrochrome from the furnace at designated intervals when sufficient metal has accumulated in the furnace. The metal is tapped from the furnace into the pre-heated ladle by opening the outlet taphole 28B which is located in refractory brickwork and discharging the metal into the ladle through a refractory lined channel (not shown). At the completion of tapping the metal from the furnace, the taphole 28B is plugged with a refractory mixture of composition designed for this purpose.

The ladle is operated periodically to carry its load of molten low carbon ferrochrome to the hot metal runner 34 and to tilt and pour that molten low carbon ferrochrome onto the hot metal runner. The hot metal runner 34 is a conventional device (e.g., like that available from Economy Industrial, LLC) and is configured to receive the molten low carbon ferrochrome deposited on it by the tilting ladle to carry the molten low carbon ferrochrome to a tundish (not shown) from whence the molten low carbon ferrochrome is fed without splashing into the casting apparatus 36. The casting apparatus 36 is a conventional ingot casting apparatus (e.g., like that available from Economy Industrial, LLC). It basically comprises a plurality of cast iron or steel alloy molds 36A on a continuous belt conveyor 36B and is configured to collect the molten low carbon ferrochrome into the molds 36A on the conveyor 36B to form respective ingots and quench those ingots with water from a water source 36C, whereupon the ingots solidify. The solidified ingots drop into the crusher apparatus 38. That apparatus includes at least one jaw 38A which crushes the ingots to form crushed granules which drop onto the screen 40. The crusher apparatus 38 is a conventional apparatus (e.g., like the Pennsylvania Crusher double toggle jaw crusher available from TerraSource Global) Those crushed granules which are of a sufficient predetermined size, e.g., approximately above 6 mm form the final low carbon ferrochrome granule product of this invention, i.e., the ferrochrome product granules, and are carried to the collecting bin 44. The bin 44 is a conventional fabricated device and is configured to hold the ferrochrome product granules until they are desired to be dispensed either as large batches into trucks 60 or small batches into bags 62, which may be transported to a steel mill or foundry, depending upon the use the ferrochrome product granules are to be put.

Those crushed granules of low carbon ferrochrome exiting the crusher apparatus 38 which are smaller in size than 6 mm, are hereinafter referred to as "fines". The fines drop through the screen 40 into the recycling bin 42 from whence they are reintroduced into the ingot molds 36A prior to addition of the molten low carbon ferrochrome, whereupon they mix with the molten low carbon ferrochrome that is subsequently introduced therein from the hot metal runner 34.

It should be noted that while the use of the fines in this manner is preferred, it is also contemplated that the fines from the recycling bin could be recycled with the recycled materials 56 of the feed materials to the blender 22 for mixing with the other feed materials for introduction into the furnace 28. In such a case, the fines when introduced into the furnace drop through the molten slag and into the molten ferrochrome, where they melt into the molten ferrochrome. In either case the fines are recaptured in the ferrochrome product granules.

It should be noted that while the ferrochrome product granules are preferably formed by use of the ingot mold apparatus 36 and the crusher apparatus 38 as just described, it is contemplated that they can be produced by other means, e.g., by granulating a stream of molten ferrochrome metal in water in a ferrochrome granulation tank (not shown) and associated dryer (not shown). One such granulating system is available from UHT, Kista, Sweden. In such a case, the molten low carbon ferrochrome is carried by the hot metal runner 34 to the ferrochrome granulation tank. The ferrochrome granulation tank is configured to break the molten low carbon ferrochrome into droplets and to rapidly quench those droplets with water provided from an inlet water source, whereupon the droplets solidify. The solidified droplets are transported from the ferrochrome granulation tank onto the screen 38. Those ferrochrome granules which are greater in size than 6 mm are carried from the screen 38 for introduction into a dryer (not shown), whereupon the heat provided within the dryer removes any residual water on those granules resulting from their quenching in the ferrochrome granulation tank. The dryer is a conventional device (e.g., like that available from UHT, Kista, Sweden.). The dried low carbon ferrochrome granules that exit the dryer form the ferrochrome product granules, which are carried to the collecting bin 44.

It should be pointed out at this juncture that a site or plant constructed in accordance with the exemplary system 20 for carrying out the process of this invention is preferably completely self-contained or enclosed in a building. In particular, the only materials produced from the process of this invention that exit the plant are the heretofore mentioned two products, namely, the ferrochrome product granules and the slag product granules. Everything else, e.g., the dust from the furnace (which may contain chromium oxides), and any spillage of materials within the material handling portion of the system 20 are provided back to the blender 22 as the recycled materials 56. This action renders the method of this invention not only economic, but environmentally protective.

As mentioned above, it is from the upper outlet port or taphole 28C of the furnace 28 that the molten slag 12 produced by the method of this invention flows when that taphole is opened. In particular, the molten slag is provided into an inlet port of the dry slag granulator 46. The dry slag granulator is a conventional device (e.g., like that available from CSIRO, Clayton Australia or from its licensee MCCC, China) and is configured to break the molten slag into droplets and to rapidly quench those droplets with air provided from an inlet air source 46A. This action results in the formation of slag granules. In particular, the molten slag is atomized or disintegrated under centrifugal forces exerted by a spinning disc to produce droplets which are then quenched and solidified using low temperature, high volume cooling air from a blower or air source 46A. This method produces slag granules of a suitable size, e.g., in the range of approximately 0.2 mm to 3 mm for use in the production of cement. Moreover, and significantly, the use of a dry slag granulator enables one to recover waste heat as hot air via port 46B which can then be reused for indirect heating by the preheater 26. Compared with the water granulation process, the dry granulation process provides an economically and environmentally sustainable approach by saving water and and recovering high-value waste heat. The hot air from the dry slag granulator 46 can also be provided to a chromite ore dryer 72 (to be described later).

The slag product granules from the dry slag granulator drop into the slag granules collecting bin 48. That bin is a conventional fabricated device and is configured to hold the slag product granules therein until they are to be dispensed as large batches into trucks 64.

It should be pointed out at this juncture that the chemistry of the slag formed by the method/process of this invention is critical to the commercially viability of that method/process. In this regard, it is desirable to minimize the melting point of the slag while maximizing its fluidity to enable it to readily flow out of the furnace. Thus, the method of this invention entails optimizing the chemistry of the slag to enhance its fluidity at the operating temperatures. To that end, the amount of burnt limestone is controlled based on the amount of magnesium oxide, aluminum oxide and silicon dioxide that is in the chromite mineral. For example, if the chromite mineral is high in silica, then the process will require the addition of more burnt limestone. If the chromite ore is low in silica then the process will use less limestone. The melting point of the chromite minerals can be from 1,700° C. to 2000° C. The method/process of this invention entails utilizing the lowest possible temperature for the melting point since that will result in the maximum fluidity. The composition of the slag will not have any effect on the exothermic reaction reducing the chromite to the low carbon ferrochrome, but will have an effect on the fluidity of the slag produced.

The chromium oxide and the iron oxide in the chromite ore is in the form of the mineral spinel. The exothermic reaction under stoichiometric conditions to reduce the oxygen out of the chromium oxide and the iron oxide may not produce enough heat to ensure that the whole mass of the feed materials becomes liquid. To ensure the reduction of chromium oxide and iron oxide is optimized, it is a common practice to use more aluminum, e.g., 105%-120%, than theoretically necessary. That technique may be used in the method/process of this invention. In addition, the heat provided by the plasma electric arc furnace ensures that there is sufficient heat to liquefy the entire mass of feed materials into a superheated bath of slag and molten metal.

The chromite feed material 50 is stored in a feed bin on the site or plant at which the system 20 is located, and is provided from its initial source, e.g., a mine, as shown in FIG. 2. Thus, as can be seen in FIG. 2, the ore from a mine is transported by ship 66 (assuming that the mine is located across some body of water requiring ship transportation) from whence it is carried by truck 68 to a stockpile 70 at the site or plant of the system 20. The chromite is dried in a conventional rotary dryer 72 and the dried chromite is then stored in a site feed bin 74 until ready for use.

The burnt lime feed material 52 is also stored in a feed bin on the site or plant at which the system 20 is located, and is provided from its initial source, e.g., a processing quarry, as shown in FIG. 3. Thus, as can be seen in FIG. 3, the burnt lime from a processing quarry is transported by blower truck 76 to a site feed bin 78 at the site or plant of the system 20 until it is ready for use.

The sand feed material 54 is also supplied and stored as dried material in a feed bin on the site at which the system 20 is located, and is provided from its initial source, e.g., a processing quarry, as shown in FIG. 4. Thus, as can be seen in FIG. 4, the sand from a processing quarry is transported by blower truck 80 to a site feed bin 82 at the site or plant of the system 20 until it is ready for use.

The process solids 56 are also stored in a feed bin on the site or plant at which the system 20 is located, and are provided from the bag house 30, and from the recycling bin 40 to a site feed bin 86 at the site or plant of the system 20 until they are ready for use as shown in FIG. 5.

The UBC 58 are also stored in a feed bin on the site or plant at which the system 20 is located, and as shown in FIG. 6 are provided from a scrap yard in the form of bales of UBC. The bales are transported by truck 77 to the site where they are stored in a stockpile 90. From the stockpile the bales are broken up and fed to a conventional shredder 92 to release non-aluminum solid matter. The non-aluminum solid matter is then separated and cleaned. In particular, the shredded UBC are provided to a conventional magnetic separator 94 to remove any magnetic particles. From there the UBC are provided to a conventional trommel 96 including a rotating screen to remove any dirt, liquids and water. From there the UBC are passed through an eddy current separator 98 to remove any non-ferrous metals, wood and other trash. From there the UBC are provided to a conventional air knife 100 to remove any residual water, plastic and paper. The resulting cleaned and separated UBC are then provided to a conventional decoater kiln 102 to remove any ink, lacquer and other coatings thereon. The decoated UBC are then provided to a conventional melter 104 where they are melted in an inert atmosphere or atmosphere containing a low level of oxygen to minimize oxidation of the surface of the molten aluminum to produce molten scrap aluminum. The molten scrap aluminum is then fed to a conventional granulator 106 where the molten aluminum from the UBC drops onto a disk to form molten aluminum droplets which are quenched with water to solidify the droplets. The solidified droplets of aluminum are then fed to a conventional shredder 108 which shreds the solidified droplets into aluminum granules of a selected size range, e.g., 0.1 mm and 2.0 mm, most suitable for the reduction of the chromite's chromium oxide and iron oxide in the plasma arc furnace. From there the aluminum granules are carried to a feed bin 110 at the site or plant of the system 20 until they are ready for use. Alternatively, the molten aluminum may be drawn into wire that is chopped into the selected, desired size range.

It should be pointed out at this juncture that the system 20 and its components as described above is merely one exemplary embodiment of various systems that can be constructed in accordance with this invention to carry out the method or process of this invention. Moreover, the exemplary method described is merely exemplary of various methods or processes for producing low carbon ferrochrome in accordance with this invention. Thus, for example, the heat produced by the dry slag granulator may not be recovered for provision to the preheater 26. Moreover, the ferrochrome fines may not be reused, if such fines could be otherwise commercialized. So too, the dust particles from the plasma furnace which are collected in the bag house may not be recycled to the recycling bin 40. Further still, other types of arc furnaces, granulation tanks and granulators can be used in lieu of the exemplary furnace 28, ingot casting apparatus 36, crusher apparatus 38, and the dry slag granulator 46, respectively. Other portions of the exemplary system 20 and the steps the exemplary method/process as described above can be eliminated, if desired, providing that the system and method/process makes use of aluminum beverage containers, whether UBC or unused aluminum beverage containers, or combinations thereof, as the exothermic source to reduce the chromium oxide and iron oxide in chromite ore and to produce a slag which is sufficiently fluid to enable the formation of the low carbon ferrochrome to be carried out economically and which itself can be readily granulated into slag granules for commercial use.

Without further elaboration the foregoing will so fully illustrate our invention that others may, by applying current or future knowledge, adopt the same for use under various conditions of service.

We claim:

1. A method for recovering low carbon ferrochrome from chromite ore comprising:
    feeding a mixture of feed materials comprising scrap aluminum granules, burnt lime, silica sand, and chromite ore into a plasma arc furnace, said chromite ore containing chromium oxide and iron oxide, said feed materials being in a stoichiometric proportion for reduction of said chromium oxide and iron oxide to form low carbon ferrochrome;
    heating said feed materials in said plasma arc furnace to a temperature in the range of approximately 1,650° C. to 1850° C. wherein said aluminum in said aluminum granules acts as a reducing agent to produce an exothermic reaction reducing said chromium oxide and iron oxide in said chromite ore to produce molten low carbon ferrochrome with molten slag floating on top of said molten low carbon ferrochrome; and
    extracting said molten low carbon ferrochrome from said plasma arc furnace.

2. The method of claim 1, additionally comprising granulating said molten low carbon ferrochrome extracted from said plasma arc furnace to produce dry granulated low carbon ferrochrome.

3. The method of claim 2, wherein said dry granulated low carbon ferrochrome is produced by casting said molten low carbon ferrochrome into ingots and thereafter breaking and crushing said ingots into said dry granulated low carbon ferrochrome.

4. The method of claim 1, additionally comprising extracting said molten slag from said plasma arc furnace and granulating said extracted molten slag into dry granulated particles of slag.

5. The method of claim 4, wherein said dry granulated particles of slag is produced by:
    using a spinning disk granulator to disintegrate the extracted molten slag to produce droplets of said molten slag; and
    quenching said droplets using a cooling gas flow from a blower, whereupon said droplets are solidified to form said dry granulated particles of slag.

6. The method of claim 5, wherein said cooling gas is air and wherein said method additionally comprises recovering heat from said air for use in drying at least one of said feed materials.

7. The method of claim 5, wherein said cooling gas is nitrogen gas and wherein said method additionally comprises recovering heat from said nitrogen gas for use in preheating said feed materials fed to said plasma arc furnace.

8. The method of claim 5, wherein nitrogen under pressure higher than atmospheric pressure is provided into said plasma arc furnace to prevent oxygen from entering into said plasma arc furnace.

9. The method of claim 8, wherein said nitrogen is heated and wherein said pressure is at least 0.5 inch of water column above atmospheric pressure.

10. The method of claim 1, wherein said plasma arc furnace includes at least one transferred arc electrode.

11. The method of claim 1, wherein said plasma arc furnace includes up to three graphite torches.

12. The method of claim 1, wherein said method is continuous.

13. The method of claim 12, wherein said feeding of said feed materials of said mixture of feed materials is controlled.

14. The method of claim 1, wherein said scrap aluminum granules comprise used beverage container aluminum granules produced from bales of scrap used beverage containers.

15. The method of claim 14, wherein said scrap aluminum granules are produced from bales of scrap used beverage containers by:
    breaking said bales into individual used beverage containers;
    shredding said used beverage containers to release non-aluminum solid matter; and
    cleaning and decoating said used beverage containers after release of non-aluminum solid matter therefrom.

16. The method of claim 15, wherein said cleaning and decoating comprises:
    separating said non-aluminum solid matter to result in residual shredded used beverage containers;
    cleaning said residual shredded used beverage containers to result in cleaned residual shredded used beverage containers;
    decoating said cleaned residual shredded used beverage containers to result in decoated cleaned residual shredded used beverage containers.

17. The method of claim 16, additionally comprising:
    feeding said cleaned decoated residual shredded used beverage containers into a melting furnace to produce molten scrap aluminum;
    solidifying said molten scrap aluminum into solidified scrap aluminum; and
    creating said scrap aluminum granules from said solidified scrap aluminum.

18. The method of claim 16, wherein said separating and cleaning is accomplished by passing said used beverage containers through a magnetic separator to remove magnetic particles, passing said used beverage containers over a screen to remove any dirt, liquids and water, passing said used beverage containers through an eddy current separator to remove any non-ferrous metals, wood and other trash, and passing said used beverage containers through an air knife to remove any residual water, plastic and paper.

19. The method of claim 16, wherein said de-coating of said individual used beverage containers is accomplished by heating said used beverage containers in a decoating furnace to remove ink, lacquer and other coatings thereon.

20. The method of claim 14, wherein said used beverage container aluminum granules have a predetermined size range between approximately 0.1 mm and 2.0 mm.

21. The method of claim 1, wherein the amount of aluminum granules used in said mixture of feed materials is equivalent to approximately 105% to 120% of the stoichiometric quantity of aluminum required to react with said chromite ore in said mixture of feed materials.

22. The method of claim 14, wherein the amount of used beverage container aluminum granules used in said mixture of feed materials is equivalent to approximately 105% to 120% of the stoichiometric quantity of aluminum required to react with said chromite ore in said mixture of feed materials.

23. The method of claim 1, wherein said scrap aluminum granules are produced from used beverage containers containing magnesium, whereupon an exothermic reaction of said magnesium with said chromite ore supplements said exothermic reaction of said aluminum.

24. The method of claim 1, additionally comprising extracting molten slag from said plasma arc furnace at an outlet taphole, and applying supplementary heat to said molten slag at said outlet taphole.

25. The method of claim 24, wherein said supplementary heat is induction heating.

26. The method of claim 25, wherein said induction heating is provided by an induction heating coil and a silicon carbide susceptor tube located at said outlet taphole.

27. The method of claim 1, additionally comprising extracting molten slag from said plasma arc furnace at an outlet taphole, and wherein said outlet taphole extends at an acute upward angle, whereupon if there is any molten low carbon ferrochrome in said slag said molten low carbon ferrochrome will drop or flow back down said taphole into said plasma arc furnace due to the fact that said molten low carbon ferrochrome has a higher density than said slag.

28. The method of claim 1, additionally comprising extracting molten slag continuously from said plasma arc furnace through a silicon carbide tube forming part of an outlet taphole, and applying supplementary heat to said molten slag inside the tube at the outlet taphole.

29. Low carbon ferrochrome produced by the method of claim 1.

30. Low carbon ferrochrome produced by the method of claim 14.

* * * * *